US011214383B2

(12) United States Patent
Delame et al.

(10) Patent No.: US 11,214,383 B2
(45) Date of Patent: Jan. 4, 2022

(54) METHOD AND ARCHITECTURE FOR DISTRIBUTING ON-BOARD POWER IN AN AIRCRAFT

(71) Applicant: LATELEC, Labege (FR)

(72) Inventors: Cyrille Delame, Toutens (FR); Jean-Paul Platzer, Ramonville Saint Agne (FR); Serge Beranger, Paris (FR)

(73) Assignee: LateLec, Labege (FR)

( * ) Notice: Subject to any disclaimer, the term of this patent is extended or adjusted under 35 U.S.C. 154(b) by 81 days.

(21) Appl. No.: 16/487,904

(22) PCT Filed: Feb. 20, 2018

(86) PCT No.: PCT/EP2018/054059
§ 371 (c)(1),
(2) Date: Aug. 22, 2019

(87) PCT Pub. No.: WO2018/153821
PCT Pub. Date: Aug. 30, 2018

(65) Prior Publication Data
US 2020/0055612 A1    Feb. 20, 2020

(30) Foreign Application Priority Data

Feb. 22, 2017  (FR) ..................... 1751382

(51) Int. Cl.
*B64D 41/00*  (2006.01)
*H02J 4/00*  (2006.01)

(52) U.S. Cl.
CPC ............... *B64D 41/00* (2013.01); *H02J 4/00* (2013.01); *B64D 2221/00* (2013.01)

(58) Field of Classification Search
None
See application file for complete search history.

(56) References Cited

U.S. PATENT DOCUMENTS 5,583,419 A * 12/1996 Haller ....................... H02J 3/14
322/8
7,950,606 B2  5/2011 Atkey et al.
(Continued)

FOREIGN PATENT DOCUMENTS

| EP | 2260560 | 12/2010 |
| EP | 2432093 | 3/2012 |
| FR | 3005377 | 11/2014 |

*Primary Examiner* — Jared Fureman
*Assistant Examiner* — Joel Barnett
(74) *Attorney, Agent, or Firm* — Defillo & Associates; Evelyn A. Defillo (57) ABSTRACT

The method for on-board electrical power distribution according to the invention includes the producing a protected segregation interface (4A) between the primary distribution (2A) and the secondary distribution network for electrical power of the cabin system (30), referred to as the cabin network, so as to comply with the quality parameters for the primary distribution (2A); controlling the extraction of electrical power from the primary distribution (2A) by a cabin management system (G1, G2) depending on the availability of electrical power on this primary distribution (2A); converting and distributing this available electrical power in the cabin network (30) according to a suitable configuration of the loads (51, 52, 53) of this cabin network (30) and defined according to an electrical configuration of type, single/three-phase AC and DC, as well as of voltage level and frequency.

15 Claims, 6 Drawing Sheets

(56) References Cited

U.S. PATENT DOCUMENTS

| | | |
|---|---|---|
| 8,136,756 B2 | 3/2012 | Duces et al. |
| 2015/0103447 A1* | 4/2015 | Brouwer ................ H02H 7/00 |
| | | 361/1 |
| 2016/0134138 A1* | 5/2016 | Jouper ................ H02J 7/0027 |
| | | 307/9.1 |
| 2017/0036773 A1* | 2/2017 | Jones .................... B64D 27/16 |
| 2017/0101067 A1* | 4/2017 | Carleial ................ B60R 16/03 |

* cited by examiner

METHOD AND ARCHITECTURE FOR DISTRIBUTING ON-BOARD POWER IN AN AIRCRAFT

CROSS REFERENCE TO RELATED APPLICATION

This application is a national stage entry of PCT/EP2018/054059 filed Feb. 20, 2018, under the International Convention and claiming priority over French Patent Application No. 1751382 filed Feb. 22, 2017.

TECHNICAL FIELD

The invention relates to a method for distributing on-board electrical power and to an architecture able to implement this method, this method and this architecture in particular being employed to distribute on-board power in the passenger cabins of aircraft. The invention also relates to an aircraft equipped with such an architecture for implementing this method. The invention is in particular applicable to commercial airplanes that use conventional means to generate electricity and that are currently in use.

The field of the invention relates to the management of the electrical power distributed by the electrical network in aircraft, and more particularly the electrical power distributed in the cabin of aircraft for the needs of cabin equipment regarding both the technical environment (pressurization, conditioned air, lighting, etc.) and the comfort of passengers (display screens, supply of power to passenger devices, etc.).

BACKGROUND OF THE INVENTION

With progress towards "all-electric" airplanes, the management of the distribution of electricity has become of key importance in terms of distributed electrical power, since electrical equipment is being substituted for certain pieces of equipment that were previously supplied with pneumatic energy (in particular in the conditioning of air in the passenger compartment) or hydraulic energy (flight control actuators, landing-gear actuators, oil or fuel pumps). Electrical certification standards guarantee for each aircraft model the capacity of its electrical generation to deliver electrical power to the distribution management system, while defining and preserving a margin of safety in all phases of flight (phases of taxiing on the ground, takeoff, ascension, cruise, descent and landing) and in case of partial loss of electrical generation.

The electrical generation is achieved by main generators—conventionally two or four generators—each driven by the propulsion engines of each wing of the aircraft, turbofans for passenger airplanes, as well as by a backup generator (driven by a small wind turbine), batteries, and an auxiliary power group that ensures the delivery of electrical and pneumatic energy during taxiing and to start up the engines.

The generators conventionally deliver three-phase voltages of 115 and 230 volts at a fixed frequency of 400 Hz (or a variable frequency in the range 360-800 Hz), a DC voltage of 28 volts being delivered by the batteries and by the main network via AC-DC converters. The energy produced by the electrical generation is then transported to the primary power distribution center of the airplane, which is located in an avionics rack conventionally arranged in the electrical equipment bay, then distributed to the electrical loads. The primary power distribution center delivers electrical power at various voltages over various busbars of the primary then secondary distribution networks, for example two 230 and 115 V AC (alternating current) busbars and one 28 V DC (direct current) busbar. The primary and secondary distribution networks form the aircraft network.

Conventionally, power distribution centers are located on two left/right lateral channels that run along the fuselage of the aircraft, and are linked to generators that are driven by the engines located on the side of the busbar channel in question. Items of equipment are connected to the various busbars depending on their requirements in terms of availability and power.

The electrical power of the primary network is thus distributed to the airplane networks from secondary electrical boxes. The equipment of the airplane systems is supplied with power, via these secondary electrical distribution networks (which are formed from busbars, cables and harnesses), from secondary boxes, depending on its location and load, in particular: actuators of the landing gear and/or for guiding/braking the front wheel of the ground-interface system; compressors of the air-conditioning system; the pumps of the system for supplying the engines with kerosene; the pumps of the hydraulic circuits of the pressurization system; deicing and ventilation actuators, the lighting and the power supply of the instrument panels of the cockpit system; the computers of the avionics bay, which is located in the cargo compartment; technical equipment (ovens of the galleys, lighting, ventilation) and domestic equipment (entertainment screens) of the networks of the cabin system, which networks are called "cabin networks" below.

The design of airplanes has a long time constant. For example, the Boeing 737 and the Airbus A320, which were brought into service in 1967 and 1987, respectively, are at the present time still the airplanes the most sold in the world. Airplane architectures, in particular airplane electrical architectures, are certified according to constraints defined at the time of design, whereas certification rules are ceaselessly changing. Each airplane is different from the preceding one, and most of the fleets of airlines are made up of airplanes of very disparate types.

Now, electrical equipment is increasingly incorporated into airplanes. This equipment is either related to the high-power electrical loads that are replacing conventional pneumatic actuators (air-conditioning compressors, pressurization pumps) or conventional hydraulic actuators (flight controls, landing-gear controls, wing deicing), or to technical loads (lighting, ventilation, display screens) and domestic loads, the latter being intended for the personal devices of passengers (smartphones, tablets, laptops, virtual reality headsets, etc.).

The supply of high-power loads and technical or domestic loads is managed by one and the same primary and secondary electrical distribution assembly. This management is for example illustrated in patent document EP 2 432 093, which recommends using a single primary power-distribution busbar coupled to a secondary converter incorporated into each secondary power distribution center, to deliver the right voltage to the pieces of equipment of the airplane systems that are connected to this secondary power distribution center.

Patent documents FR 3 005 377 and U.S. Pat. No. 7,950,606 make provision to multiply the number of secondary power distribution centers in order to locate them as close as possible to the loads to be supplied. However, no particular measures are described therein as regards the supply of the electrical loads of the passenger cabin from the primary power distribution.

Moreover, patent document U.S. Pat. No. 8,136,756 dedicates high-power loads, for example three-phase voltages, to busbars supplied by a first electrical generation assembly comprising starter generators, whereas the power of loads requiring conventional power comes from busbars supplied by an electrical generation assembly formed by other starter generators or conventional generators. This generator-level allocation of sources allows obtainable power per unit weight to be increased using starter generators of high rotation speed (allowing frequencies varying between 800 and 2000 Hz to be achieved).

However, the needs of the cabin are rapidly changing, in particular as regards loads close to passengers (screens, individual lighting, connectivity, etc.) in a technological cycle closer to that of telecommunications and connected electronics (smartphones, tablets, laptops, virtual reality headsets, etc.). However, none of the prior-art solutions allow the supply flexibility that is required for adaptation to these needs. However, provision is made for such an adaptation in successive passenger-cabin refittings.

The prior-art solutions are thus required, to distribute electrical power to the cabin networks, to convert the voltage and frequency of the electrical power delivered by the primary distribution network, in the context of avionic protection standards. However, these standards govern the safety of high-power distribution for high-load pieces of equipment (actuators of the landing gear, air-conditioning compressors, pumps, wing-deicing activators, etc.) and the conversions thus involve over-dimensioned pieces of power-electronic equipment (autotransformers), in order to be able to guarantee the respect of certification standards. Under these conditions, the electrical distribution is established statically, in a context dimensioned to establish rigid and preestablished operating modes.

SUMMARY OF THE INVENTION

In contrast, the invention aims to allow a flexibility of adaptation to the loads on the networks following cabin refittings of a given fleet without bringing into question airplane certifications. To do this, the invention makes provision for an interface that forms a functional and structural separation between, on the one hand, the avionics electrical power architecture associated with the certification of the airplane, whatever its design date, and, on the other hand, the architecture of the electrical networks of the passenger cabin, the latter architecture being adaptable over time to supply the technical and domestic loads associated with the needs of the passengers. Such an independence also allows independent power sources to be added to the cabin network while respecting the standards of the avionic power network. To do this, the invention makes provision to dynamically manage the electrical power of the distribution network of the cabin depending on the power available in the rest of the power distribution network, by combining and adapting various power sources without decreasing the quality of the avionic network.

More precisely, the present invention relates to a method for distributing on-board electrical power in an aircraft comprising a passenger cabin and a primary distribution of electrical power to secondary networks for distributing electrical power to airplane systems, the primary distribution being coupled to the generation of electrical power by the engine(s) of the aircraft. The method consists in forming a segregating and protecting power-distribution interface between the primary distribution and the secondary network for distributing electrical power of the cabin system, which network is called the cabin network, by an electrical isolation with respect to relative perturbations acting on the primary distribution, in controlling the extraction of electrical power from the primary distribution via a cabin management depending on the availability of electrical power in this primary distribution, in converting and distributing this available electrical power to the cabin network depending on a suitable configuration of the loads of this cabin network, which configuration is defined depending on an electrical categorization by single-/three-phase AC or DC, and by voltage and frequency level.

According to particular embodiments, the method may make provision for:

the perturbations of the primary distribution pertain to quality parameters relating to the degree of harmonic distortion generated by the loads, to the level of the frequencies of the AC voltages, to the variation in voltage level, and/or to the power factor;

the management of the cabin networks is controlled dynamically so that the extraction of power from the primary distribution to supply all of the loads of the cabin networks does not exceed the nominal power of the primary distribution and does not perturb the quality parameters of nominal operation of the primary distribution;

at least one auxiliary power unit is used to deliver electrical power to the cabin networks in addition to the electrical power of the primary distribution according to the availability of the primary electrical power;

the suitable configuration of the cabin network is redefined by incorporating other voltage and/or frequency levels by voltage conversion after segregation.

The invention also relates to an architecture for distributing electrical power on-board an aircraft in particular incorporating a passenger cabin and a fuselage. This architecture comprises, on each side of the fuselage, a left/right network for distributing electrical power, composed, for each left/right network, of a network for distributing a primary distribution of electrical power, which distribution is controlled by an avionic management system, the primary network being coupled to secondary networks for distributing electrical power to airplane systems. Coupled to each left/right primary distribution network, a cabin-system power distribution center, incorporating an interface of segregating and protecting means combining controlling or monitoring and adjusting means for preventing perturbation of the primary network, distributes electrical power to each secondary distribution network of the cabin system, which networks are called cabin networks. A cabin management unit controls, in interface with the avionic management system and in light of the consumption needs of the loads of the cabin network, the extraction of electrical power from each primary network depending on the availability of this network, in order to distribute it to the consuming loads of the cabin network, which loads are distributed, via a configuration of busbars, depending on the type of voltage and the voltage and frequency level of these loads.

According to preferred embodiments:

the controlling or monitoring and adjusting means for preventing perturbation of the primary network are chosen from among, in partial up to complete combination, systems for filtering harmonic currents rejected to the primary network, capacitors and/or inductors that are adjustable in order to regulate power factor, a device for controlling or monitoring the voltage level on the primary network in conjunction with a device for automatically unloading loads in case of a voltage drop, and/or a command to equitably distribute the loads on the three-phase voltage busbars;

each cabin management unit comprises a signal-processing box of contactors of the cabin network depending on data on the availability of the primary network, which data are delivered by boxes for controlling the power of buses or busbars and distributed in the secondary networks of the aircraft systems, and depending on data from the avionic management system;

auxiliary power units that supply AC and/or DC voltage are coupled to the busbars of the cabin network via contactors in order to deliver supplementary electrical power to the cabin network independently of the electrical power of the primary network;

each cabin network comprising at least one three-phase voltage busbar and one DC voltage busbar, a three-phase/DC voltage converter and/or a DC/three-phase voltage converter is (are) coupled between the three-phase busbar and the DC busbar;

at least one busbar of the network for distributing power to domestic loads of each cabin network is coupled to at least one busbar of the network for distributing power to technical loads of the cabin network via at least one AC/AC voltage converter and/or DC/AC voltage converter;

contactors, which are also actuated by the signal-processing box, are coupled to the converters of the domestic network and between the busbars of the domestic network and the domestic loads;

a circuit for distributing power to the technical loads and domestic loads of the cabin network is formed in rows of seats by way of standard disconnect boxes that distribute electrical power to interchangeable seat-interface boxes that are mounted on interchangeable seat links;

each cabin management unit is controlled or monitored by a member of the cabin crew through a control interface.

In the present text, technical consumption relates to conditioning devices (pressurization, common lighting, air conditioning, galleys) and comfort devices (individual ventilation and lighting, display screens) whereas domestic consumption is to be understood to relate to personal devices of passengers (smartphones, tablets, etc.).

BRIEF DESCRIPTION OF THE FIGURES

Other data, features and advantages of the present invention will become apparent on reading the following nonlimited description, with reference to the appended figures, which show, respectively.

DETAILED DESCRIPTION OF THE INVENTION

In the description below, identical reference signs relate to the same element and refer to the passage(s) of the text that describe it.

Figure 1:
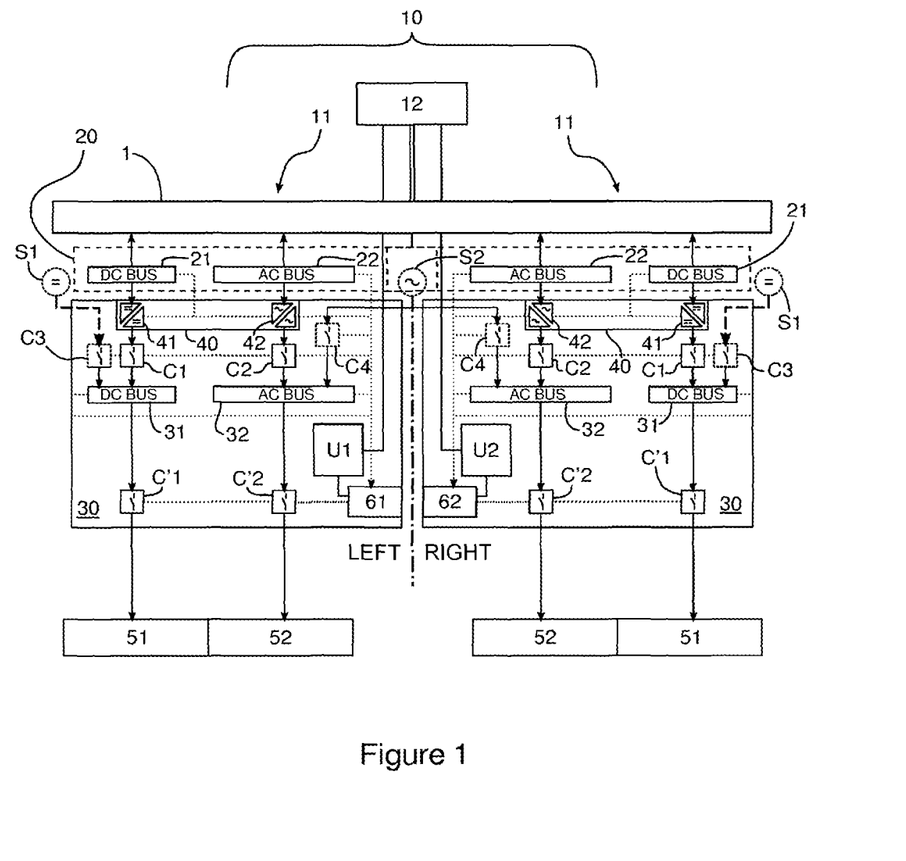
FIG. 1, a basic block diagram of an example of an architecture of a network for distributing power via AC and DC voltage busbars for supplying technical loads of a cabin network and employing a segregation of the primary network according to the invention.

With reference to the block diagram of the network architecture of FIG. 1, the illustrated architecture 10 comprises, on each left/right side of an aircraft fuselage (not shown), a network 11 for distributing electrical power, which network is controlled by an avionic management system 12 depending on flight conditions and phases.

Each left/right network 11 is composed of a primary distribution network 20 and secondary networks for distributing electrical power, such as the illustrated cabin network 30, which networks are coupled to the primary network 20 via power distribution centers, such as the distribution center 40 of the cabin network 30. The electrical power of the primary network 20 is delivered by generators coupled to the engines of the aircraft (which are not shown).

Each cabin distribution center 40 incorporates, in interface between the primary network 20 and each cabin network 30, a combination of segregating means 41, 42 that electrically protect and isolate the primary network 20 from the cabin networks 30 in order to ensure the quality parameters of this primary network 20 are respected, while permitting amperage to be varied over a large interval. The combination of perturbation-preventing segregation means 41, 42 is, in the example, a combination of systems for filtering harmonic currents, which could be rejected to the primary network 20, and of resonant circuits for regulating power factor. Advantageously, a device for controlling or monitoring voltage level on the primary network 20, in conjunction with a device for automatically unloading loads in case of voltage drop, or devices allowing an effect of the same order. As a variant, in the case where the primary network 20 comprises two three-phase voltage bars, for example of voltages of 115 and 230 volts, an equitable distribution of the loads between these three-phase voltage busbars may also advantageously be controlled or monitored and applied by the avionic management system 12.

Thus, each cabin distribution center 40 draws electrical power from the primary network 20 in order to distribute it to the DC voltage technical loads 51 (environmental-control and processing devices: pressurization, air-conditioning, common lighting, etc.) and the AC voltage technical loads 52 (passenger comfort devices: individual ventilation and lighting, display screens, etc.) via the busbars 31 and 32, respectively. A signal-processing box 61/62 of a cabin management unit U1/U2 controls each left and right cabin network 30—in particular: the busbars 31 and 32, contactors C1, C2 and C'1, C'2 placed upstream and downstream of the busbars 31 and 32, and the cabin power distribution centers 40—in conjunction with data from the cabin unit U1/U2 and from the avionic management system 12. Each cabin link unit U1/U2 thus serves as interface between the avionic management system 12 and the consumption needs of the loads of the cabin network 30.

This box 61/62 serves as a cabin-crew interface, allowing the cabin crew to monitor and adapt the distribution of power to each cabin network 30 in predefined and adaptable limits. As a variant, the management is automated and the box 61/62, if provision is made therefor in the installation, then advantageously serves to communicate information on the distribution of power to the cabin networks 30 to cabin crew.

Two auxiliary power units S1 and S2, fuel cells or other types of battery, may advantageously deliver a supplementary electrical supply of AC and DC voltage to each cabin network 30, by coupling to the busbars 31 and 32 a voltage of same type via contactors C3 and C4, in addition and independently of the electrical power of the primary network 20. These auxiliary power units S1 and S2 may be solicited by the cabin management unit U1/U2, via the signal box 61/62 of the contactors C3 and C4, depending on the ability of the primary network 20 to provide power.

Specifically, the electrical power is distributed depending on data on the availability of the busbars 21 and 22 of each primary network 20, which data are transmitted to the avionic management system 12 by boxes for controlling the power of buses and busbars and distributed in the secondary networks of the other airplane systems 1, which systems are called aircraft systems below, depending on data specific to the avionic management system 12, which reflect the flight conditions and phases, and depending on the power of the technical consumption loads 51 and 52 of the cabin networks 30. As a variant, the domestic or technical loads, for example the galleys, that require high power, are supplied directly by the busbars 21/22 of the primary networks 20 after segregation.

Two examples of dynamic distribution of the delivery of electrical power, in which examples 100% and 50% of the sources are available, respectively, are described below depending on the needs of the networks of the cabin system and of the networks of the aircraft systems 1. In any case, the power extracted from the primary network does not exceed the primary nominal power given the flight conditions and phase.

In the first example, each busbar 21/22 of each left/right primary network 20 delivers a nominal power—assumed to be constant over time—of 45 kW, whether this be with an AC voltage or DC voltage, respectively. The supply needs of the loads of the aircraft systems 1, supplied by each busbar 21/22, amount to 15 kW, and the needs of the loads of each busbar 31/32 of the cabin network 30 amount to 25 kW, also to be delivered by each busbar 21/22.

It will be clear that, in this example, the power required (4×(15+25)=160 kW) to supply all of the cabin loads and aircraft systems 1 is lower than the available power (4×45=180 kW). Taking into account the variation in the needs and while preventing overload of the primary networks 20, each cabin management unit U1/U2, which units control the electrical supply of the loads of the cabin, gives priority to the supply of the loads of aircraft systems 1. To do this, a plurality of situations in terms of the needs for power to be delivered from each source (busbar 21/22) may be considered.

When the power needs of the aircraft systems 1 (for example 15 kW) and of the cabin system (for example up to 30 kW) do not exceed the available power (45 kW), the secondary networks of the aircraft systems are correctly supplied without overloading the source.

However, if the need of the cabin system increases beyond 30 kW (for example to 35 kW) so that the power demanded by the secondary cabin networks 30 and the secondary aircraft networks 1 (for example 35+15 kW=50 kW) exceeds the available power (45 kW), the power actually delivered to the cabin system from each source is limited to 30 kW in order not to overload the source. The cabin management unit U1/U2 then draws electrical power from the auxiliary power units S1 and S2, by acting on the contactors C3 and C4 via the corresponding box 61/62, if the power demand of the loads of the cabin system persists or increases.

If, subsequently, the power of the aircraft systems 1 also increases (for example passes from 15 to 18 kW), the in-cabin consumption is decreased to 27 kW (instead of 30 kW) in order to satisfy the higher priority power need of the aircraft systems 1 without overloading the source. When the consumption of the aircraft systems 1 decreases once more (for example by passing from 18 to 15 kW), the cabin management unit U1/U2 meets the need of the cabin system (by passing from 27 to 30 kW) without overloading the corresponding source. If the lack of power persists or increases, the auxiliary power units S1 and S2 may also deliver power as above.

Figure 2:
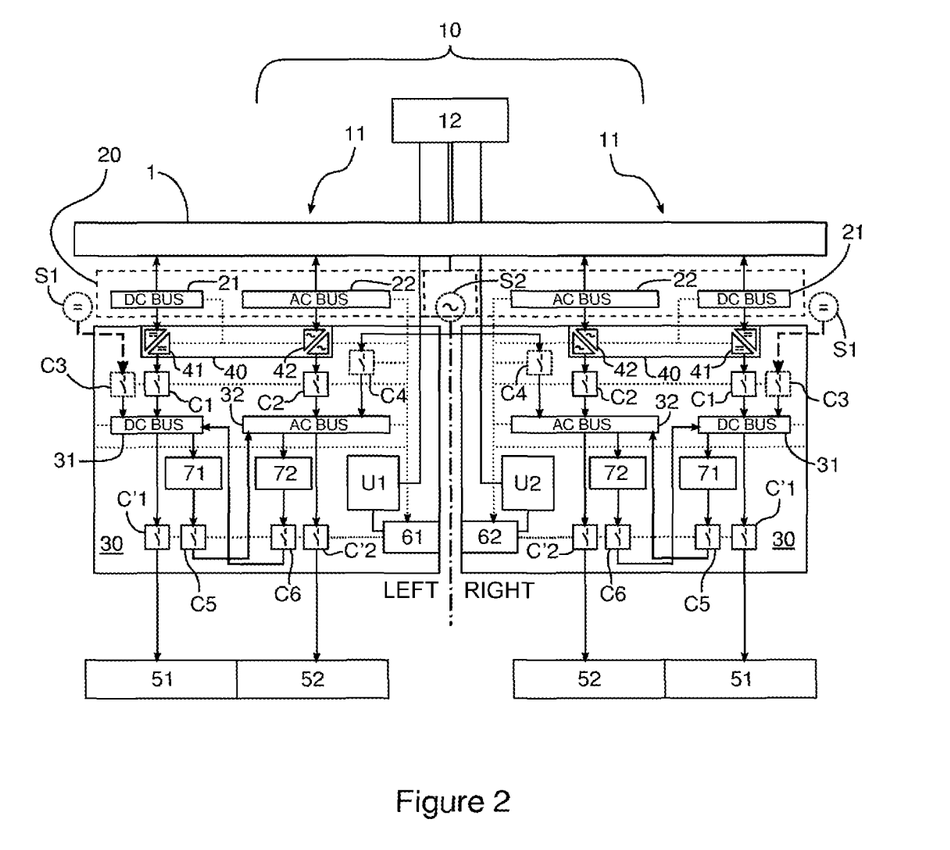
FIG. 2, a block diagram showing the example network architecture of FIG. 1 with incorporation of converters between the busbars of the cabin network.

Such a dynamic adaptation of the AC and DC voltage powers of the technical loads 51 and 52 of the networks of the cabin system is also illustrated in the block diagram of FIG. 2, which has the same basic configuration as FIG. 1. In this block diagram, each left/right cabin network 30 incorporates an inverter 71 for current flow between the DC voltage busbar 31 and the AC voltage busbar 32, and a rectifier 72 for current flow between the AC voltage busbars 32 and the DC voltage busbar 31. Contactors C5 and C6, controlled by each signal-processing box 61/62, are associated with each converter 71 and 72.

Under these conditions, variations in power availability on the busbars 31 and 32 may be compensated for by the cabin management unit U1/U2 by performing an addition of power to one or other of the busbars 31 and 32 in power deficit when the other busbar 32 or 31 is able to deliver the supplementary addition of power. The technical loads 51 and 52 are then correctly supplied.

In the second example of operation with 50% of the power sources, in the case of a failure of a power generator of the left side, the overall power drops to 90 kW with respect to the preceding example.

The busbars 21/22 of the primary network 20 remain supplied with an available power divided on average by half, namely 22.5 kW on each busbar of each cabin network. The cabin management unit U1/U2 may still potentially supply all the cabin loads. However, the supplies of the cabin loads will be more greatly limited than in the first example because the available power is lower and the aircraft systems remain higher priority. In addition, the technical environmental-control and processing cabin loads and their supply will be privileged.

Figure 3:
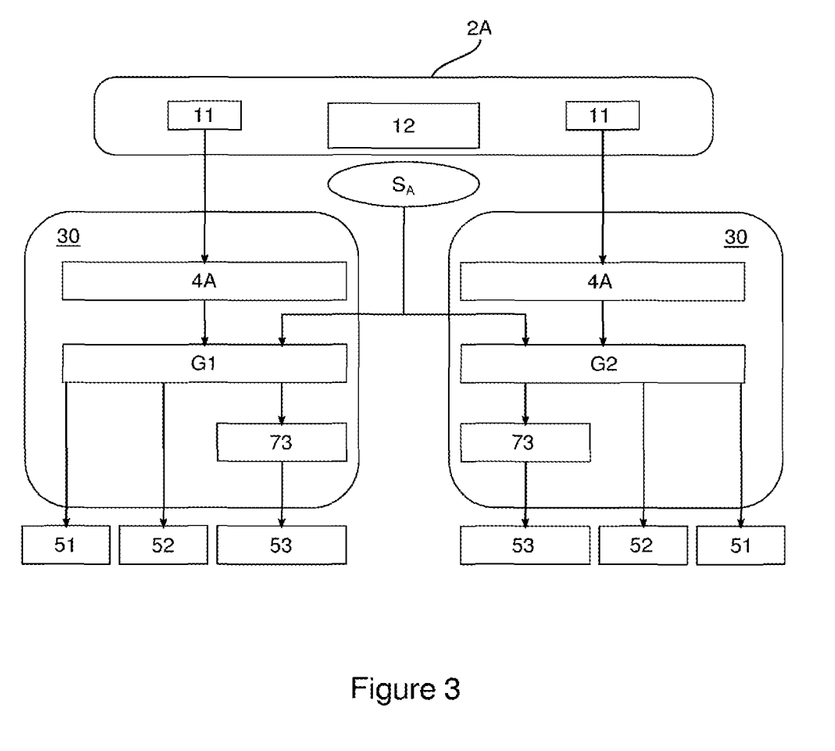
FIG. 3, a functional diagram of distribution of electrical power in the cabin networks of the architecture of FIG. 1 incorporating a conversion of AC voltage for supply to domestic loads.

When each cabin network 30 incorporates domestic loads (smartphones, etc.), the network architecture of the type illustrated in FIG. 1 obeys the functional schematic of electrical power distribution of FIG. 3, which incorporates a supply of domestic consumption loads 53.

In this functional schematic, a primary distribution 2A of electrical power, which is controlled or monitored by the avionic management system 12, delivers electrical power to the DC voltage technical loads 51 and AC voltage technical loads 52 of each cabin network 30 via a double segregation 4A of AC and DC voltage networks. The electrical powers are then controlled or monitored by a cabin management system G1/G2, which is implemented by the cabin management unit U1/U2, which is associated with the signal-processing box 61/62 (see FIGS. 1 and 2), and distributed to supply the AC and DC voltage loads 51 and 52.

The supply of the domestic loads 53 is realized by a voltage conversion 73 after the segregations 4A and is controlled or monitored by the cabin management system G1/G2. In order to compensate for the power deficits coming from the primary distribution 2A, the electrical power coming from the auxiliary power units $S_A$ is also controlled or monitored by the cabin management system G1/G2.

Figure 4:
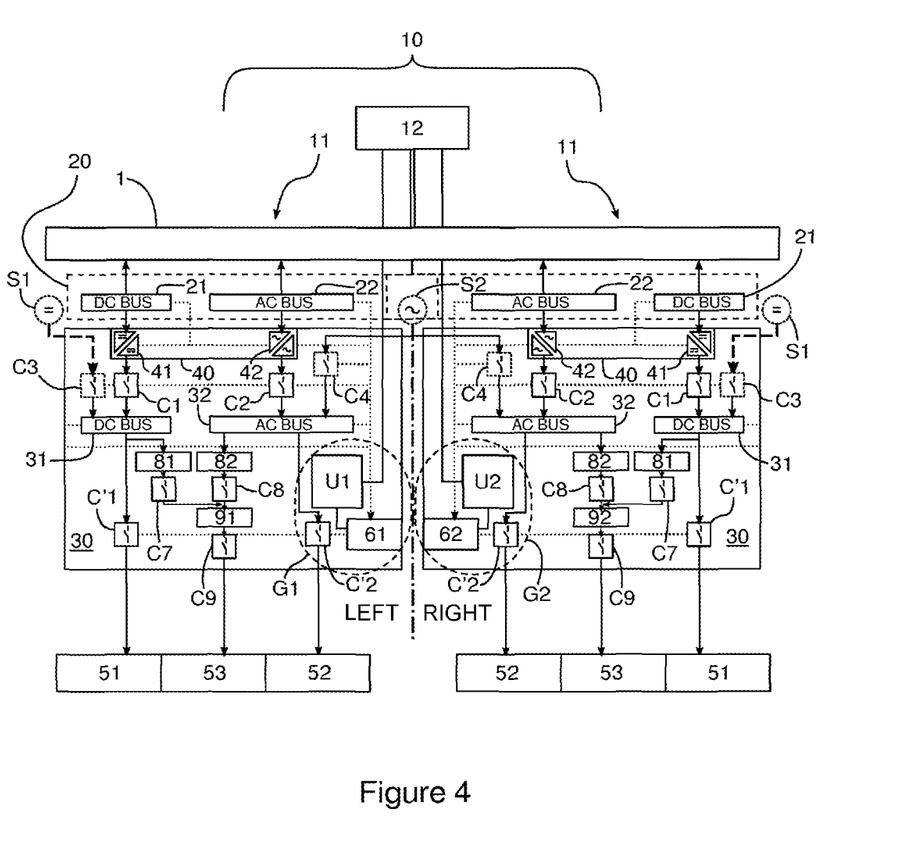
FIG. 4, a block diagram similar to the block diagram of FIG. 1 but incorporating converters between the busbars of the cabin network for supplying the technical loads and a busbar for supplying domestic loads.

The supply of the domestic loads 53 is illustrated in the block diagram of FIG. 4, which has the same basic configuration as FIG. 1. In this block diagram, each cabin network 30 incorporates an inverter 81 for current flow between the DC voltage busbar 31 and, advantageously, a busbar 91/92 for supplying domestic loads 53 with AC voltage. Each cabin network 30 also incorporates a converter-regulator 82 for AC current flow between the busbars 32 and the busbar 91/92. Contactors C7 and C8 associated with each converter 81 and 82 and contactors C9 and C10, for coupling the busbar 91/92 to the domestic loads 53, are controlled by the cabin management system G1/G2.

The incorporation of the converters 81 and 82 allows, in operation, variations in power availability on the busbars 31 and 32 to be compensated for by each signal-processing box 61/62 in conjunction with the cabin management unit U1/U2; power is added to the busbar 31 or 32 in power deficit when the other busbar 32 or 31 is able to deliver the supplementary added power. The domestic loads 53 are then correctly supplied. In addition, the auxiliary power units S1 and S2 may also supply electrical power to the busbars 31 and 32.

In the example, the converters 71 and 72 of technical type and/or the converters 81 and 82 of domestic type allow so-called domestic AC voltage levels of 115 volts at 60 Hz or of 220 volts at 50 Hz to be obtained from AC voltages of 115 volts at 400 Hz or of 230 volts at variable frequency (for example in the interval 360-800 Hz).

Figure 5A:
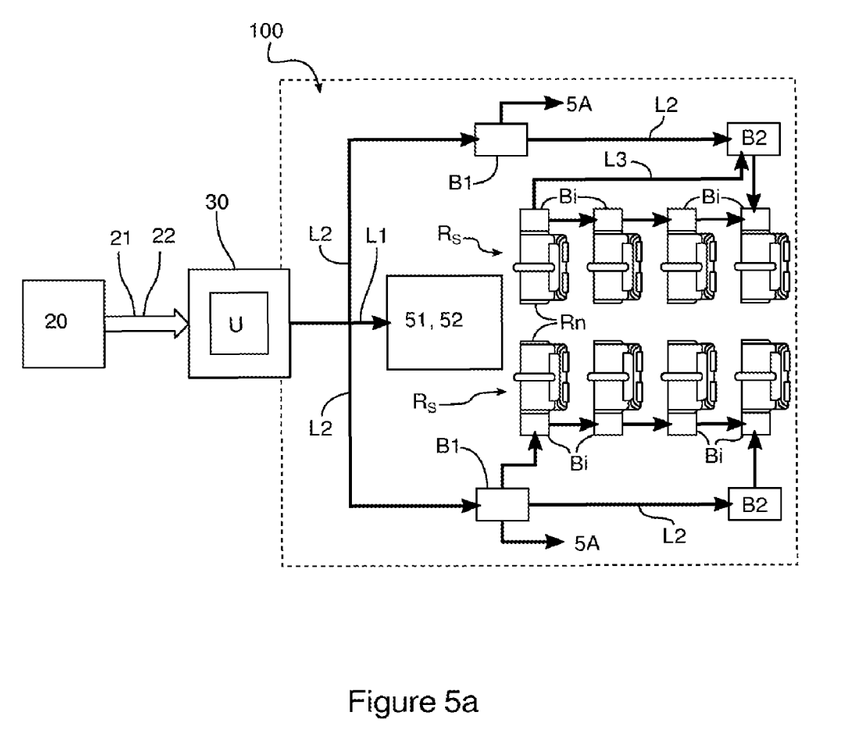
FIG. 5a, a schematic of the architecture of distribution of the supply to loads of the cabin network from standard electrical-distribution disconnect boxes.

A schematic of the architecture of the distribution of the supply to domestic and technical loads of each cabin network 30 is illustrated in FIG. 5a. In this schematic, the busbars 21 and 22 of each primary network 20 transmit electrical power, via the cabin networks 30 described above, to the circuit 100 for distributing power to the loads, and under the control of the cabin management unit "U" (this reference relating to one or other of the preceding units U1 and U2).

This circuit 100 comprises resident electrical links L1 for supplying technical environmental-control and processing loads 51, 52 (galleys, air conditioning, pressurization, common lighting, etc.) and passenger-comfort technical loads (individual ventilation and lighting, display screens, etc.), and a resident electrical link L2—for supplying domestic loads 53 (see FIGS. 3 and 4: smartphones, etc.)—along each of the two rows $R_S$ of seats.

Standard disconnect boxes B1 and B2, which are mounted on the resident links L2, perform an electrical distribution to interchangeable seat links L3 from interchangeable interface boxes B1 that are arranged at the foot of each row of seats Rn. The first standard disconnects boxes B1 in the direction of flow of the current deliver the electrical power to lighting loads 5a of the cabin.

Figure 5B:
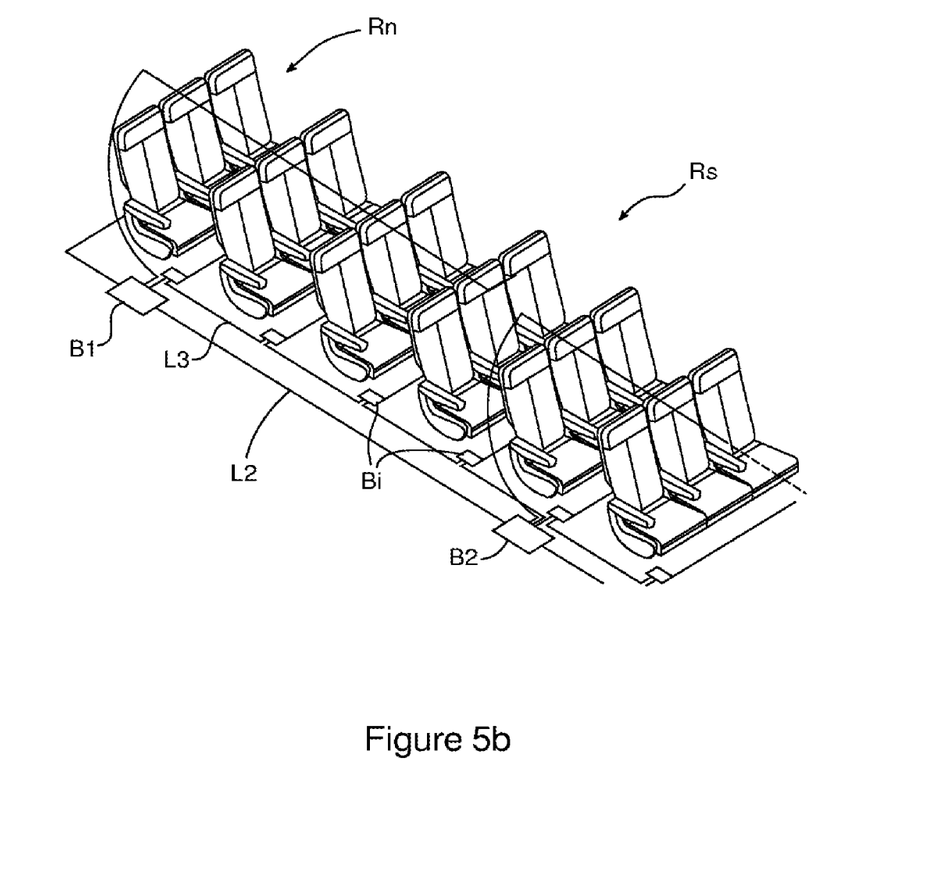
FIG. 5b, a schematic perspective view of rows of seats of an airplane passenger compartment, said rows being equipped with interchangeable electrical-distribution interface boxes.

In the perspective view of FIG. 5b, one of the rows $R_S$ of seats of an airplane passenger cabin is illustrated in more detail. As in FIG. 5a, the interchangeable electrical-distribution interface boxes Bi are placed facing each row of seats Rn. Furthermore, these interface boxes B1, which are supplied by the standard disconnect boxes B1 and B2 that are mounted on the resident links L2, are connected by interchangeable links L3.

The invention is not limited to the examples described and shown. Thus, the auxiliary power units may be batteries or accumulators. The management of the electrical power of the cabin networks may be automated, and the cabin crew intervene through the management interface only in a limited context, for example in the case where safety is in play. As a variant, this management may be entirely automated and the management interface then remains limited to an information interface.

Moreover, the supply of the domestic loads may result from a conversion of the AC or DC voltage of the corresponding busbar, or from the combination of two conversions as described above.

Likewise, to supply the technical environmental-control, processing and passenger-comfort loads, a single converter between the AC and DC voltage busbars may be used, with a rectifier or inverter, instead of the combination of two converters described above.

The invention claimed is:

1. A method for distributing on-board electrical power in an aircraft comprising a passenger cabin and a primary distribution of electrical power to secondary networks for distributing electrical power to airplane systems, the primary distribution being coupled to the generation of electrical power by engine(s) of the aircraft, the method comprising the steps of:
  forming a segregating and protecting power-distribution interface between the primary distribution and the secondary networks for distributing electrical power of the passenger cabin,
  electrically isolating with respect to perturbations acting on the primary distribution,
  controlling the extraction of electrical power from the primary distribution via a cabin management depending on the availability of electrical power in the primary distribution,
  converting and distributing the available electrical power to the secondary networks depending on a configuration of loads of the secondary networks, in which configuration is defined, depending on an electrical categorization by single-/three-phase AC or DC, and by voltage and frequency level.

2. The method as claimed in claim 1, wherein the perturbations of the primary distribution pertain to quality parameters relating to the degree of harmonic distortion generated by the loads, to the level of the frequencies of the AC voltages, to the variation in voltage level, and/or to the power factor.

3. The method as claimed in claim 1, wherein the management of the secondary networks is controlled dynamically so that the extraction of power from the primary distribution to supply all of the loads of the secondary networks does not exceed the nominal power of the primary distribution and does not perturb the quality parameters of nominal operation of the primary distribution.

4. The method as claimed in claim 1, wherein at least one auxiliary power unit is used to deliver electrical power to the secondary networks in addition to the electrical power of the primary distribution according to the availability of the primary electrical power.

5. The method as claimed in claim 1, wherein the configuration of the secondary networks is redefined by incorporating other voltage and/or frequency levels by voltage conversion after segregation.

6. An architecture for distributing electrical power on-board an aircraft incorporating a passenger cabin and a fuselage, the architecture having, on each side of the fuselage, a network for electrical power distribution, each network having a primary electrical power distribution controlled by an avionic management system and being coupled to a secondary networks for electrical power distribution to airplane systems, and the architecture comprises, coupled to each primary distribution, a cabin-system power distribution center incorporating an interface of segregating and a protecting device combining controlling or monitoring and an adjusting device for preventing perturbation of the primary electrical power distribution, the power distribution center distributing electrical power to each secondary network of the cabin system, wherein the networks are secondary networks, and also comprises a cabin management unit that controls, in interface with the avionic management system and in light of the consumption needs of loads of the secondary networks, the extraction of electrical power from each primary electrical power distribution depending on the availability of the network, in order to distribute electrical power to the loads of the secondary networks, which loads are distributed, via a configuration of busbars, depending on the type of voltage and the voltage and frequency level of these loads.

7. The architecture as claimed in claim 6, wherein the controlling or monitoring and adjusting device for preventing perturbation of the primary electrical power distribution are chosen from among, in partial up to complete combination, systems for filtering harmonic currents rejected to the primary electrical power distribution, capacitors and/or inductors that are adjustable in order to regulate power factor, a device for controlling or monitoring the voltage level on the primary electrical power distribution in conjunction with a device for automatically unloading the loads in case of a voltage drop, and/or an equitable distribution of the loads on the three-phase voltage busbars.

8. The architecture as claimed in claim 6, wherein each cabin management unit comprises a signal-processing box of contactors of the secondary networks depending on data on the availability of the primary electrical power distribution, which data are delivered by boxes for controlling the power of buses or busbars and distributed in the secondary networks of the aircraft systems, and depending on data from the avionic management system.

9. The architecture as claimed in claim 8, wherein each cabin management unit is controlled or monitored by a member of the cabin crew through the signal-processing box.

10. The architecture as claimed in claim 6, wherein auxiliary power units that supply AC and/or DC voltage are coupled to the busbars of the secondary networks via contactors in order to deliver supplementary electrical power to the secondary networks independently of the electrical power of the primary electrical power distribution.

11. The architecture as claimed in claim 6, wherein each secondary networks comprising at least one three-phase voltage busbar and one DC voltage busbar, a three-phase/DC voltage converter and/or a DC/three-phase voltage converter is (are) coupled between the three-phase busbar and the DC busbar.

12. The architecture as claimed in claim 11, wherein at least one busbar of the network for distributing power to domestic networks of each secondary network is coupled to at least one busbar of the domestic networks for distributing power to technical loads of the secondary networks via at least one AC/AC voltage converter and/or DC/AC voltage converter.

13. The architecture as claimed in claim 12, wherein the contactors, which are actuated by the signal-processing box, are coupled to the converters of the domestic network and between the busbars of the domestic networks and the domestic networks.

14. The architecture as claimed in claim 13, wherein a circuit for distributing power to the technical loads and domestic loads of the secondary networks is formed in rows of seats by way of standard disconnect boxes that distribute electrical power to interchangeable seat-interface boxes that are mounted on interchangeable seat links.

15. An aircraft comprising a passenger cabin and a double network for distributing electrical power, which network is composed of a primary electrical power distribution and secondary networks for distributing electrical power to the airplane systems, wherein the aircraft is equipped with an architecture for distributing electrical power as claimed in claim 6.

* * * * *